United States Patent
Liensberger et al.

(10) Patent No.: US 10,803,056 B2
(45) Date of Patent: Oct. 13, 2020

(54) WEB SERVICE INTERFACE AND QUERYING

(71) Applicant: MICROSOFT TECHNOLOGY LICENSING, LLC, Redmond, WA (US)

(72) Inventors: Christian Liensberger, Bellevue, WA (US); Moe Khosravy, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/532,185

(22) Filed: Aug. 5, 2019

(65) Prior Publication Data

US 2019/0377730 A1   Dec. 12, 2019

Related U.S. Application Data

(63) Continuation of application No. 15/664,472, filed on Jul. 31, 2017, now Pat. No. 10,423,612, which is a (Continued)

(51) Int. Cl.
| | | |
|---|---|---|
| *G06F 16/242* | (2019.01) | |
| *G06F 16/248* | (2019.01) | |
| *G06F 16/958* | (2019.01) | |
| *G06F 16/9535* | (2019.01) | |
| *G06F 16/955* | (2019.01) | |
| *G06F 16/957* | (2019.01) | |
| *G06F 9/451* | (2018.01) | |
| *G06F 3/0482* | (2013.01) | |
| *G06F 3/0484* | (2013.01) | |
| *H04L 29/08* | (2006.01) | |

(52) U.S. Cl.
CPC ........ *G06F 16/2428* (2019.01); *G06F 3/0482* (2013.01); *G06F 3/04847* (2013.01); *G06F 9/451* (2018.02); *G06F 16/248* (2019.01); *G06F 16/958* (2019.01); *G06F 16/9535* (2019.01); *G06F 16/9566* (2019.01); *G06F 16/9577* (2019.01); *G06F 16/986* (2019.01); *H04L 67/02* (2013.01)

(58) Field of Classification Search
CPC .................................................. G06F 16/2428
USPC ........................................................ 715/200
See application file for complete search history.

(56) References Cited

U.S. PATENT DOCUMENTS

9,471,690 B2 * 10/2016 Liensberger ........ G06F 16/9566
9,740,733 B2 *  8/2017 Liensberger .......... G06F 16/248
(Continued)

*Primary Examiner* — William D Titcomb
(74) *Attorney, Agent, or Firm* — Workman Nydegger (57) ABSTRACT

Methods, systems, and computer-readable media are disclosed to generate an interface for a web service and to query the web service. A method includes generating a user interface associated with a web service. The user interface includes one or more input parameter options associated with the web service. The user interface is generated based on a service specification and one or more series specifications associated with the service specification. User input is received via the user interface, where the user input includes a selection of at least one of the one or more input parameter options. A query of the web service is generated based on the user input, and the query reflects at least one selected input parameter option.

20 Claims, 9 Drawing Sheets

Related U.S. Application Data continuation of application No. 15/249,003, filed on Aug. 26, 2016, now Pat. No. 9,740,733, which is a continuation of application No. 14/333,789, filed on Jul. 17, 2014, now Pat. No. 9,471,690, which is a continuation of application No. 12/616,796, filed on Nov. 12, 2009, now Pat. No. 8,812,962.

(56) References Cited

U.S. PATENT DOCUMENTS

| | | | |
|---|---|---|---|
| 9,785,916 B2 * | 10/2017 | Kanjilal | ............... G06Q 10/107 |
| 10,423,612 B2 * | 9/2019 | Liensberger | ............ H04L 67/02 |
| 2019/0377730 A1 * | 12/2019 | Liensberger | .......... G06F 3/0482 |

* cited by examiner

WEB SERVICE INTERFACE AND QUERYING

CROSS-REFERENCE TO RELATED APPLICATIONS

This application is a continuation of U.S. patent application Ser. No. 15/664,472 filed on Jul. 31, 2017, entitled "WEB SERVICE INTERFACE AND QUERYING," which is a continuation of U.S. patent application Ser. No. 15/249,003 filed on Aug. 26, 2016, entitled "WEB SERVICE INTERFACE AND QUERYING," which issued as U.S. Pat. No. 9,740,733 on Aug. 22, 2017, which is a continuation of U.S. patent application Ser. No. 14/333,789 filed on Jul. 17, 2014, entitled "Web Service Interface and Querying," which issued as U.S. Pat. No. 9,471,690 on Oct. 18, 2016, which is a continuation of U.S. patent application Ser. No. 12/616,796 filed on Nov. 12, 2009, entitled "WEB SERVICE INTERFACE AND QUERYING," which issued as U.S. Pat. No. 8,812,962 on Aug. 19, 2014, wherein all of the foregoing are incorporated herein by reference in their entireties.

BACKGROUND

Web services have become an increasingly popular way to achieve inter-computer communication over a network. Web services are typically accessed via queries that are defined based on application programming interfaces (APIs). However, learning how to use such APIs may be a time-consuming process and may require users to review a significant amount of web service documentation. Further, web servers that host web services often offer dozens of APIs, or more. API-based web service access typically requires computer programming knowledge. Due to the lack of visual feedback in text-based computer programs, API-based web service access may be unintuitive. Thus, constructing a web service query can be a long and demanding process for users.

BRIEF SUMMARY

The present disclosure describes automated interface generation for a web service where the interface enables queries of the web service based on user input. Thus, web service operation may be wholly driven via user input at the interface. The web service interface may be generated based on service and series specifications (e.g., XML, files). In response to user input, the web service interface may be automatically refreshed to reflect the received input, thereby providing an "active" interface to the web service. When a query of the web service is invoked, the interface may display a preview of the results generated by the query. Interface generation and query building enables users to leverage web services without learning complex application programming interfaces (APIs). In addition, uniform resource identifiers (URIs) and program classes may be automatically generated and retrievable by users to re-execute previously invoked queries.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems, methods, and computer-readable media to generate an interface for a web service and to query the web service are disclosed. In a particular embodiment, a system includes a memory and a processor coupled to the memory. The processor is configured to retrieve instructions from the memory that cause execution of an interface module, a query module, and a results module. The interface module is configured to generate a user interface associated with a web service, where the user interface includes one or more input parameter options associated with the web service. The interface module is also configured to receive user input via the user interface, where the user input includes a selection of at least one of the one or more input parameter options. The interface module is further configured to automatically refresh the one or more input parameter options at the user interface based on the received user input. The query module is configured to generate a query of the web service based on the received user input. The query reflects the at least one selected input parameter option. The query module is also configured to invoke the generated query with respect to the web service to generate results, and the results module is configured to automatically display the results at the user interface.

In another particular embodiment, a method includes generating a user interface associated with a web service. The user interface includes one or more input parameter options associated with the web service. The user interface is generated at a computer system based on an extensible markup language (XML) service specification and one or more XML, series specifications associated with the XML, service specification. Alternately, the specifications may be represented in any computer-recognizable language (e.g., text file, rich text format (RTF), or hyper text markup language (HTML)). The method also includes receiving user input via the user interface, where the user input includes a selection of the one or more input parameter options. The method further includes generating a query of the web service based on the received user input, where the query reflects the selection of the one or more input parameter options. The method includes invoking the generated query with respect to the web service and automatically adding results of the invoked query to the user interface.

In another particular embodiment, a computer-readable medium is disclosed. The computer-readable medium includes instructions, that when executed by a computer, cause the computer to receive a user interface associated with a web service from a web server, where the user interface includes one or more input parameter options associated with the web service. The user interface is generated based on an extensible markup language (XML) service specification and one or more XML series specifications associated with the XML service specification. The computer-readable medium also includes instructions, that when executed by the computer, cause the computer to display the user interface and to receive user input at the user interface. The user input includes a selection of at least one of the one or more input parameter options. The computer-readable medium further includes instructions, that when executed by the computer, cause the computer to transmit the user input to a web server and to receive a modified user interface from the web server, where the modified user interface reflects the user input. The computer-readable medium includes instructions, that when executed by the computer, cause the computer to display the modified user interface, to generate a query of the web service based on the received user input, and to transmit the generated query to the web server. The computer-readable medium also includes instructions, that when executed by the computer, cause the computer to receive results based on an invocation of the generated query from the web server and to display the results at the modified user interface.

Figure 1:
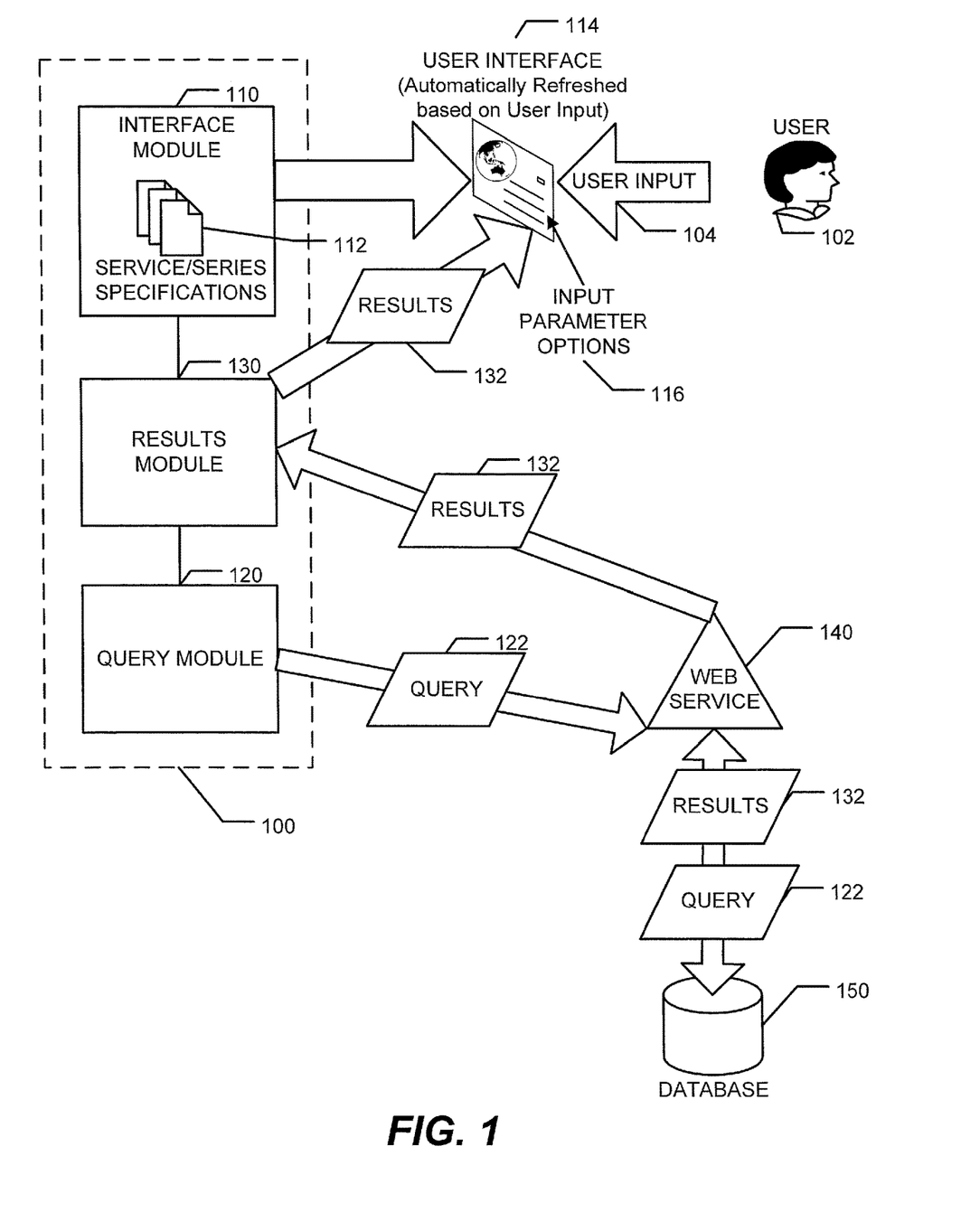
FIG. 1 is a diagram to illustrate a particular embodiment of a system to generate an interface for a web service and to query the web service.

FIG. 1 is a diagram to illustrate a particular embodiment of a system 100 to generate an interface (e.g., an illustrative user interface 114) for a web service 140 and to query the web service 140. The web service 140 is communicatively coupled to the system 100. The web service 140 may also be communicatively coupled to one or more data sources (e.g., an illustrative database 150).

The system 100 includes an interface module 110 configured to generate the user interface 114 for the web service 140, where the user interface 114 includes one or more input parameter options 116. In a particular embodiment, the user interface 114 is generated based on service and series specifications 112 associated with the web service 140. For example, the service and series specifications 112 may be extensible markup language (XML) files that include information useable to build a query of the web service 140. Information useable to build a query of the web service 140 may include a paging permission, a service title, a service description, list parameters, series uniform resource identifier (URI) templates, series identifiers, series source paths, and parameter types/bounds/options (e.g., string, integer, floating point, and Boolean). The series source paths included in a service specification may be useable to generate URIs associated with a particular series specification. For example, a series source path may be appended to a series URI template to generate a URI for a particular series specification. An illustrative XML service specification is further described with respect to FIG. 3. An illustrative XML series specification is further described with respect to FIG. 4. Illustrative user interfaces are further described with respect to FIGS. 5-6.

The interface module 110 is also configured to receive user input 104 (e.g., from the user 102) via the user interface 114. The user input 104 may include a selection of one or more of the input parameter options 116. Upon receiving the user input 104, the interface module 110 may automatically refresh the user interface 114 to reflect the user input 104. In a particular embodiment, the user interface 114 is refreshed in accordance with one or more auto-refresh URIs included in the service and series specifications 112. For example, automatically refreshing the user interface 114 based on the user input 104 may include refreshing the display of graphical user interface (GUI) elements associated with the input parameter options 116 (e.g., a drop down menu associated with a list parameter) or updating one or more bounds (e.g., minimum and maximum values of numeric values or a maximum length of string values) of the input parameter options 116. Auto-refresh operations at an interface associated with a web service are further described with respect to FIG. 5.

The system 100 includes a query module 120 that is configured to generate a query 122 of the web service 140 based on the received user input 104. The query 122 reflects the selection of the one or more of the input parameter options 116. The query module 120 is also configured to invoke the generated query 122 with respect to the web service 140 to generate results 132 of the query invocation. For example, the web service 140 may provide data querying abilities with respect to the database 150, and the query module 120 may invoke the query 122 (e.g., a query that filters certain tables of the database 150) to generate the results 132 (e.g., the resulting filtered data from the selected tables of the database 150). In a particular embodiment, one or more of the web service 140 and the database 150 are remote to the system 100 and are accessible via one or more data communications networks (e.g., the Internet). It should be noted that although the web service 140 and the database 150 are illustrated as being remote from each other, the web service 140 and the database 150 may instead be located at a single computing device, such as a web server or database server, or at a single location.

In a particular embodiment, the query module 120 is further configured to automatically generate one or more program classes (e.g., C++ classes, C # classes, or Java classes) that are useable to invoke the query 122. For example, the selected one or more input parameter options 116 may be encapsulated within the program classes or may be provided as input parameters to an invocation method of the program classes. The user interface 114 may be operable (e.g., via a hyperlink) by the user 102 to retrieve the one or more program classes. Using program classes to invoke the query 122 may include transmitting authorization information such as an account key and a session identifier (e.g., a globally unique identifier (GUID)) to the web service 140. Thus, program classes may enable execution of the query 122 when the system 100 is in an offline or powered-down state. Hyperlinks for program classes are further illustrated with reference to FIG. 6.

In a particular embodiment, the query module 120 is further configured to generate a representational state transfer (REST) URI that is useable to invoke the query 122 without execution of the query module 120. That is, the REST URI may be used to invoke the query 122 at anytime, including when the system 100 is not in operation. For example, the selected one or more input parameter options 116 may be encapsulated (e.g., in encrypted or clear-text format) as part of the REST URI. When the REST URI is invoked (e.g., at a browser), the selected one or more input parameter options 116 are transmitted to the web service as part of the REST URI. Thus, REST URIs may enable execution of the query 122 when the system 100 is in an offline or powered-down state. REST URIs are further illustrated with reference to FIG. 6.

The system 100 includes a results module 130 that is configured to receive results 132 of the invocation of the query 122 and to automatically display the received results 132 at the user interface 114. In a particular embodiment, the query module 120 is configured to selectively invoke the query 122 in multiple data interchange formats (e.g., RAW XML, JavaScript Object Notation (JSON), or Atom Syndication Format (ATOM 1.0)), and the results module 130 is configured to selectively format the results 132 in any of the multiple data interchange formats (e.g., RAW XML, JSON, and ATOM 1.0), in addition to a standard tabular format.

In a particular embodiment, a spreadsheet application at the system 100 may accept the results 132 as input data, thereby providing the user 102 with an ability to analyze or perform advanced analytics with respect to the results 132.

In operation, the interface module 110 may generate the user interface 114 for the web service 140 and the user 102 may provide user input 104 by interacting with the user interface 114. Based on the user input 104 (e.g., selections of one or more of the input parameter options 116), the user interface 114 may automatically refresh the user interface, update hyperlinks for program classes generated by the query module 120, and update the display of REST URIs generated by the query module 120.

The query module 120 may generate the query 122 of the web service 140 based on the user input 104 and may invoke the query 122. The query 122 may reflect user selection of one or more of the input parameter options 116. The web service 140 may retrieve results 132 of the query 122 from the database 150. The results module 130 may receive the results 132 and may display the results 132 at the user interface 114.

It will be appreciated that the system 100 of FIG. 1 may provide an "active" interface for web service query generation by automatically refreshing the user interface 114 to stay current with and reflect user input 104 received from the user 102. It will also be appreciated that the system 100 of FIG. 1 may simplify web service query generation. For example, instead of spending time learning how to use complex application programming interfaces (APIs) of the web service 140, users that know what data they are interested in (e.g., what input parameter options 116 should be reflected by the query 122) may instead operate the user interface 114 to retrieve a dynamically created program class or a REST URI that is useable to invoke the query 122. Such dynamically created program classes and REST URIs may be used even when the system 100 is not in operation.

It will further be appreciated that the system 100 of FIG. 1 may provide a preview mechanism that may assist query modification. For example, the user 102 may make incremental changes to the query 122 and the system 100 may enable the user 102 to preview effects of the incremental changes in the results 132 generated by the query 122. It will also be appreciated that web services (e.g., existing web services or newly created web services) may be made compatible with the interface generation and querying capability of the system 100 of FIG. 1 by providing series and service specifications (e.g., the specifications 112) for the web service (e.g., the web service 140). Such series and service specifications may be provided by web service developers. Alternately, series and service specifications may be automatically generated (e.g., based on source code or definition files of web services).

Figure 2:
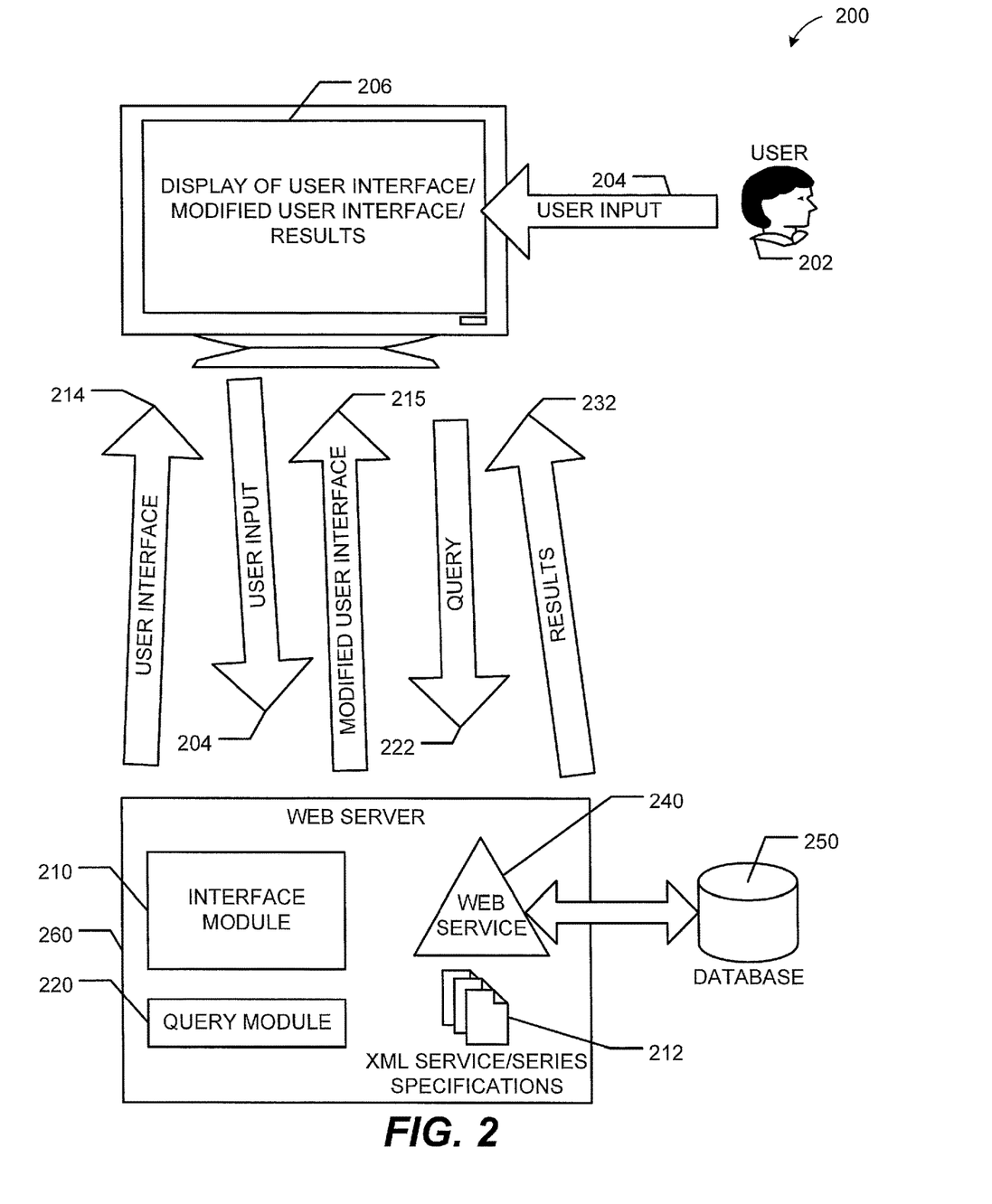
FIG. 2 is a diagram to illustrate another particular embodiment of a system to generate an interface for a web service and to query the web service.

FIG. 2 is a diagram to illustrate another particular embodiment of a system 200 to generate an interface for a web service 240 and to query the web service 240. The web service 240 may be located at a web server 260 that is communicatively coupled to a database 250 and to a display device 206 (e.g., a display coupled a computing device). In an illustrative embodiment, the web service 240 is the web service 140 of FIG. 1 and the database 250 is the database 250 of FIG. 1.

An interface module 210 may generate a user interface 214 for the web service 240 and may transmit the user interface 214 for display at the display device 206. For example, the user interface 214 may be generated based on XML, service and series specifications 212 for the web service 240. The interface module 210 may also receive user input 204 from a user 202 that is operating the user interface 214. The user input 204 may include a selection of one or more input parameter options associated with the web service 240 and that are displayed at the user interface 214. The interface module 210 may automatically generate a modified user interface 215 based on the user input 204 and may transmit the modified user interface 215 for display at the display device 206. Thus, from the perspective of the user 202, the user interface 214 may be automatically refreshed to the modified user interface 215.

The web server 260 also includes a query module 220. In a particular embodiment, the query module 220 generates a query of the web service 240 based on the user input 204. In another particular embodiment, the user interface 214 (and the modified user interface 215) include query generation logic that is configured to generate a query 222 based on the user input 204 and to transmit the query 222 to the web server 260. The query module 220 may invoke the query 222 with respect to the web service 240 to generate results 232, and the results 232 may be transmitted for display at the display device 206. In a particular embodiment, the results 232 are retrieved from the database 250 by the web service 240 based on the contents of the query 222.

In operation, the interface module 210 may generate the user interface 214 for the web service 240 and may transmit the user interface 214 for display at the display device 206. The user 202 may provide user input 204 by interacting with the user interface 214. Based on the user input 204, the interface module 210 may generate a modified user interface 215 and may transmit the modified user interface 215 for display at the display device 206.

The query 222 may be generated based on the user input 204 and may be invoked by the query module 220 to generate the results 232. For example, the web service 240 may retrieve the results 232 from the database 250 based on the contents of the query 222. The results 232 may be transmitted for display to the display device 206.

It will be appreciated that the system 200 of FIG. 2 may provide interface generation, interface display, and query generation at different computing devices. For example, a web service developer or vendor associated with the web service 240 and the database 250 may develop a web site at the web server 260. The web site may include the user interface 214, the modified user interface 215, and the results 232. In such an example, users such as the user 202 may be able to visit the web site to drive operation of the web service instead of learning complex APIs associated with the web service. It will thus be appreciated that the system 200 of FIG. 2 may enable software developers and data vendors to simplify web service usage.

Figure 3:
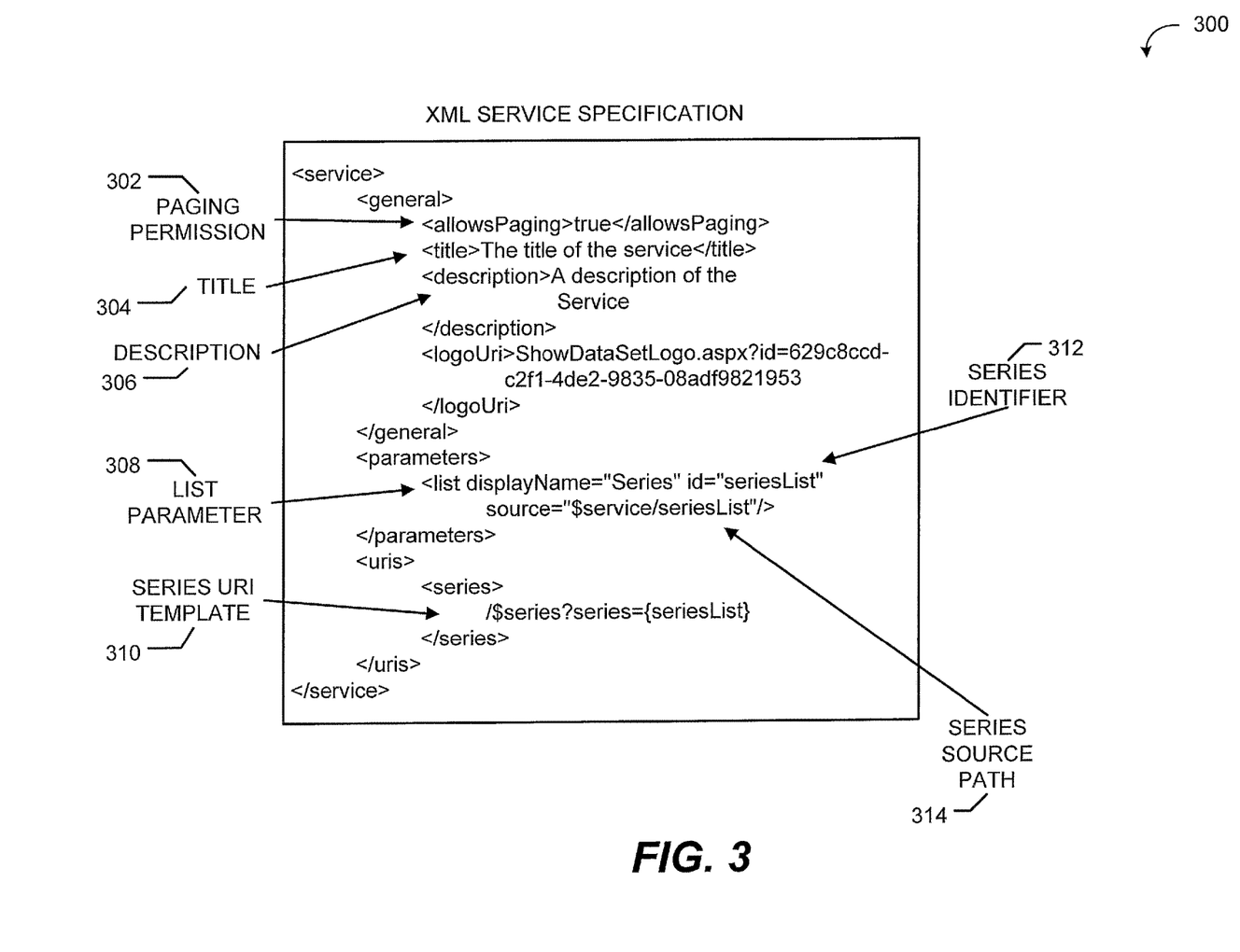
FIG. 3 is a diagram to illustrate a particular embodiment of a service specification that may be used with the system of FIG. 1 or the system of FIG. 2.

FIG. 3 is a diagram to illustrate a particular embodiment of an XML service specification 300 that may be used with the system 100 of FIG. 1 or the system 200 of FIG. 2. For example, the XML, service specification 300 may be included in the service and series specifications 112 of FIG. 1 or the service and series specifications 212 of FIG. 2.

In a particular embodiment, the XML service specification 300 may be fetched by appending a known string (e.g., "/$service") to the end of a base URL of a web service. For example, the service specification for locally running a United States crime statistics service "http://localhost/services/UsCrimeService.svc" may be fetched at the URL "http://localhost/services/UsCrimeService.svc/$service." In a particular embodiment, a service specification exists for each data set hosted by the service. For example, a service specification for a "majorcrimes" data set may be fetched at the URL "http://localhost/services/UsCrimeService.svc/majorcrimes/$service."

The XML, service specification 300 may include a plurality of nodes. For example, the service specification may include a root node (illustratively labeled as "<service>" in FIG. 3) that includes general nodes (e.g., a Boolean paging permission 302, a string service title 304, a string service description 306, and a logo URI operable to retrieve a logo image associated with the service).

The root node may also include parameter nodes, which include list parameters (e.g., a list parameter 308), and URI nodes. Each list parameter may represent a list of possible data values that are displayed as a drop down menu. In a particular embodiment, each list parameter includes a display name that is used as a label for the drop down menu, a unique series identifier (ID) 312, and a series source path 314. A URI node may include one or more series nodes, where each series node includes a series URI template 310 that may be used to generate a URI for a particular series specification. For example, the series source path 314 may be appended to the series URI template 310 to generate a URI for a particular series specification. For example, if the value of "services" is 4, the URI may be "http://localhost/services/UsCrimeService.svc/series?series=4."

Figure 4:
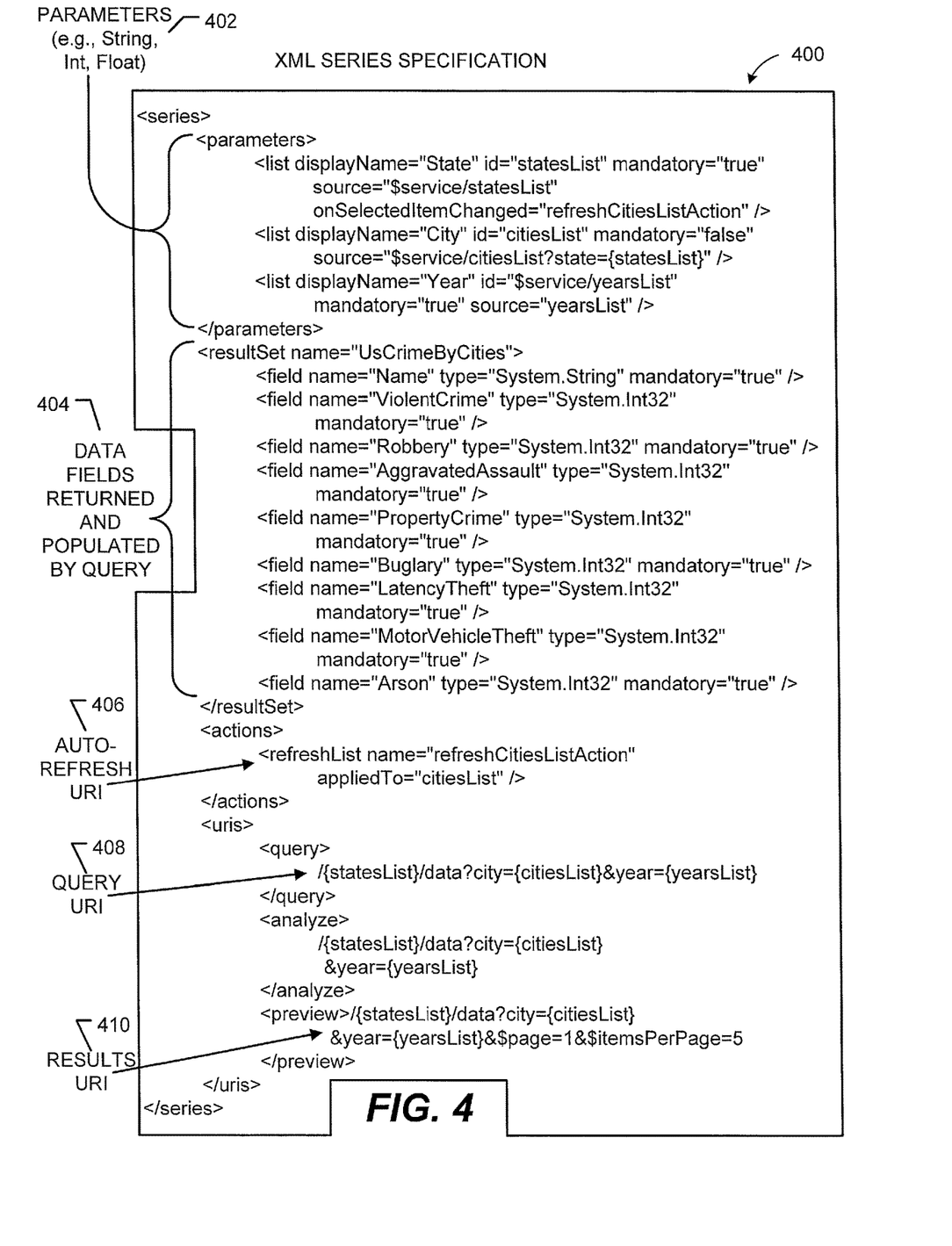
FIG. 4 is a diagram to illustrate a particular embodiment of a series specification that may be used with the system of FIG. 1 or the system of FIG. 2.

FIG. 4 is a diagram to illustrate a particular embodiment of an XML, series specification 400 that may be used with the system 100 of FIG. 1 or the system 200 of FIG. 2. For example, the XML series specification 400 may be included in the service and series specifications 112 of FIG. 1 or the service and series specifications 212 of FIG. 2.

As described with respect to FIG. 3, a web service may host one or more data series. Each of the one or more data series may have an associated series specification. The URI for each particular series specification may be generated based on a series URI template (e.g., the series URI template 310 of FIG. 3) and a series source path (e.g., the series source path 314 of FIG. 3) included in a service specification (e.g., the XML service specification 300 of FIG. 3).

The series specification 400 may include a plurality of nodes. For example, the series specification may include a root node (illustratively labeled as "<series>" in FIG. 4) that includes one or more of a parameters node, a result set node, an actions node, and a URIs node. The parameters node may include parameters 402 that are defined for the particular series. For example, in the particular embodiment illustrated in FIG. 4, the parameters "State," "City," and "Year" are defined for the US statistics service, where each of the parameters is a list parameter (e.g., the service is capable of retrieving statistics for multiple states, cities, and years). Each such list parameter may be displayed as a drop down list at a user interface generated in accordance with the series specification 400. The parameters 402 may also include string parameters, integer parameters, and floating point parameters.

Each list parameter may point to a list document (e.g., "statesList," "citiesList," and "yearsList" in FIG. 4). Each list document may be an XML file with item nodes representing the values of the drop down menu. For example, the "statesList" document may include:

```
<list>
    <item key="Alabama">Alabama<item>
    <item key="Alaska">Alaska<item>
    <item key="Arizona">Arizona<item>
    <item key="Arkansas">Arkansas<item>
    <item key="California">California<item>
    <item key="Colorado"> Colorado <item>
    <item key="Connecticut"> Connecticut <item>
    <item key=""Delaware">Delaware<item>
    . . .
</list>
```

The result set node may include data fields 404 that are returned and populated by a query invocation. For example, in the particular embodiment illustrated in FIG. 4, invoking a query with respect to the US crime statistics service returns a string "Name" field and integer fields for "Violent Crime," "Robbery," "AggravatedAssault," "Property Crime," "Burglary," "Larceny," "MotorVehicleTheft," and "Arson."

The actions node may include actions that are performed based on selection of the parameters 402. Thus, a different action may be associated with each list value of a drop down menu at a web service interface. For example, in the particular embodiment illustrated in FIG. 4, the actions node contains an auto-refresh URI 406 that is useable to automatically refresh a user interface generated in accordance with the XML series specification 400 when a user selects one or more of the parameters 402. For example, if a user selects the state "Texas," a drop down menu for "Cities" may be automatically refreshed in accordance with the auto-refresh URI 406 (e.g., the drop down menu for "Cities" may be changed to include cities in Texas and not include cities in any other state). Auto-refresh operations at an interface associated with a web service are further described with respect to FIG. 5.

The URIs node may include a query node, an analyze node, and a preview node. The query node may include a query URI 408 that is useable to query the web service for data. The analyze node may include a URI that is useable to perform advanced data analysis (e.g., at a spreadsheet application) on data generated by querying the web service. The preview node may include a results URI 410 that is useable to generate a preview of the data generated by querying the web service. In a particular embodiment, the results URI is used to display results at a user interface as described with reference to the results 132 of FIG. 1 and the results 232 of FIG. 2.

It should be noted that although the XML service specification 300 and the XML, series specification 400 are illustrated in FIGS. 3-4 as XML, files, service specifications and series specifications may instead be represented in any computer-recognizable language (e.g., text file, rich text format (RTF), or hyper text markup language (HTML)).

Figure 5:
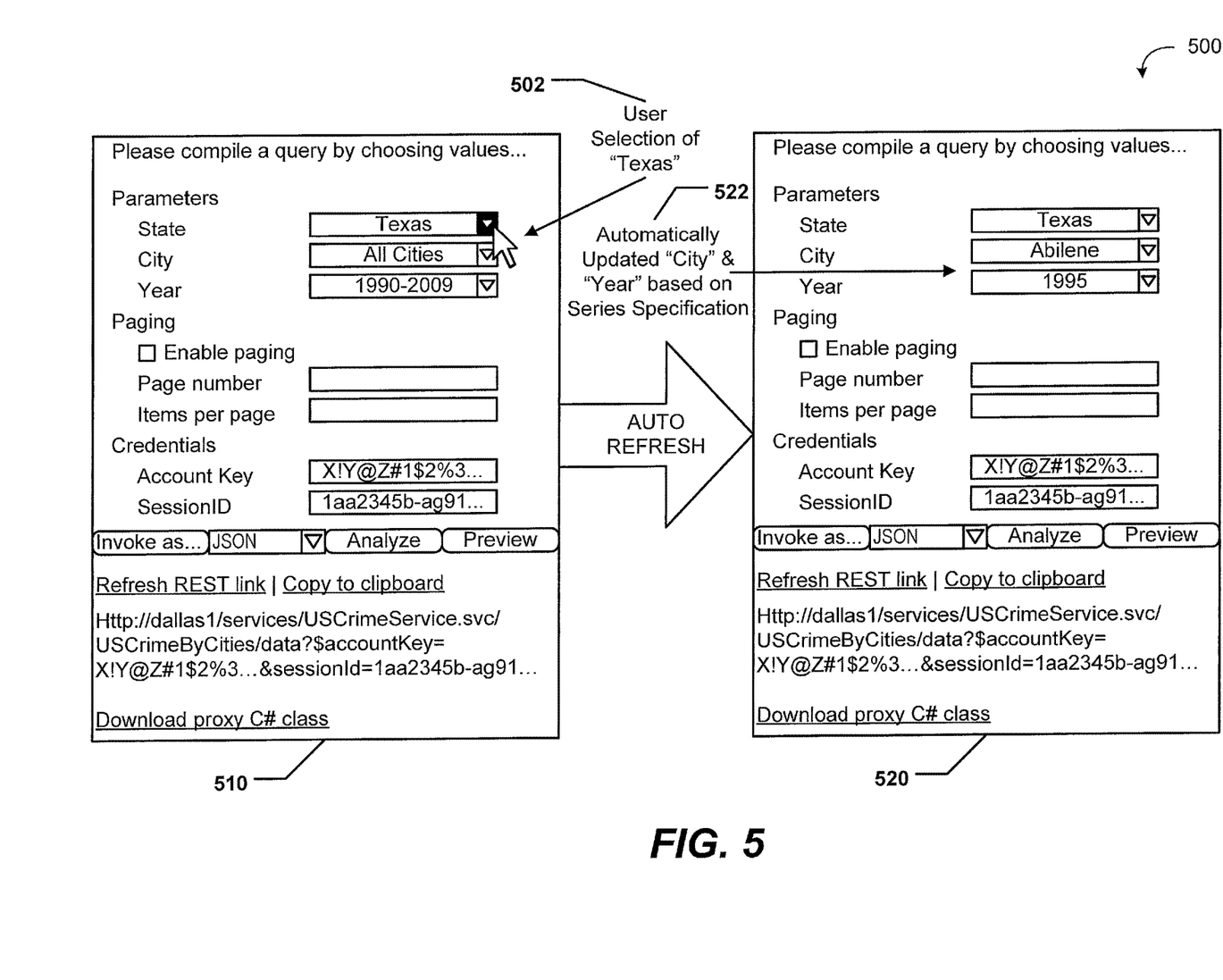
FIG. 5 is diagram to illustrate a particular embodiment of automatically refreshing an interface for a web service based on user input.

FIG. 5 is diagram to illustrate a particular embodiment 500 of automatically refreshing an interface for a web service based on user input. In the particular embodiment illustrated in FIG. 5, the user interface 510 is refreshed to the user interface 520. For illustrative purposes, the user interfaces 510 and 520 are depicted as interfaces to the US crime statistics web service described with respect to FIG. 3 and FIG. 4.

User interfaces for web services may be refreshed in response to user input. For example, user input 502 indicating a user selection of "Texas" in the State drop down menu at the user interface 510 may trigger an auto-refresh operation. The result of the auto-refresh operation may be the user interface 520, where bounds of the City and Year drop down menus are automatically updated 522 based on series specification(s) associated with Texas. For example, in the particular embodiment illustrated in FIG. 5, the initial City drop down reflects an unbounded set of available cities in the USA, and the initial Year drop down menu reflects an unbounded set of all available years (e.g., 1990-2000). In response to the user input 502, the City drop down menu is automatically set to "Abilene" (e.g., the first city in Texas, in alphabetical order, for which the US crime statistics service is able to retrieve data) and the Year drop down menu is automatically set to 1995 (e.g., the earliest year for which the US crime statistics service is able to retrieve data for Abilene, Tex.). The bounds of City drop down menu are set (e.g., available cities in Texas), and minimum/maximum values of the Year drop down menu are also set (e.g., to the earliest and latest years for which data related to the state of Texas is available).

It will be appreciated that automatically refreshing user interfaces for web services as illustrated in FIG. 5 may provide an "active" interface for web service query generation. For example, user interfaces may be automatically refreshed to stay current with and reflect user input (e.g., the user input 502) received from a user.

Figure 6:
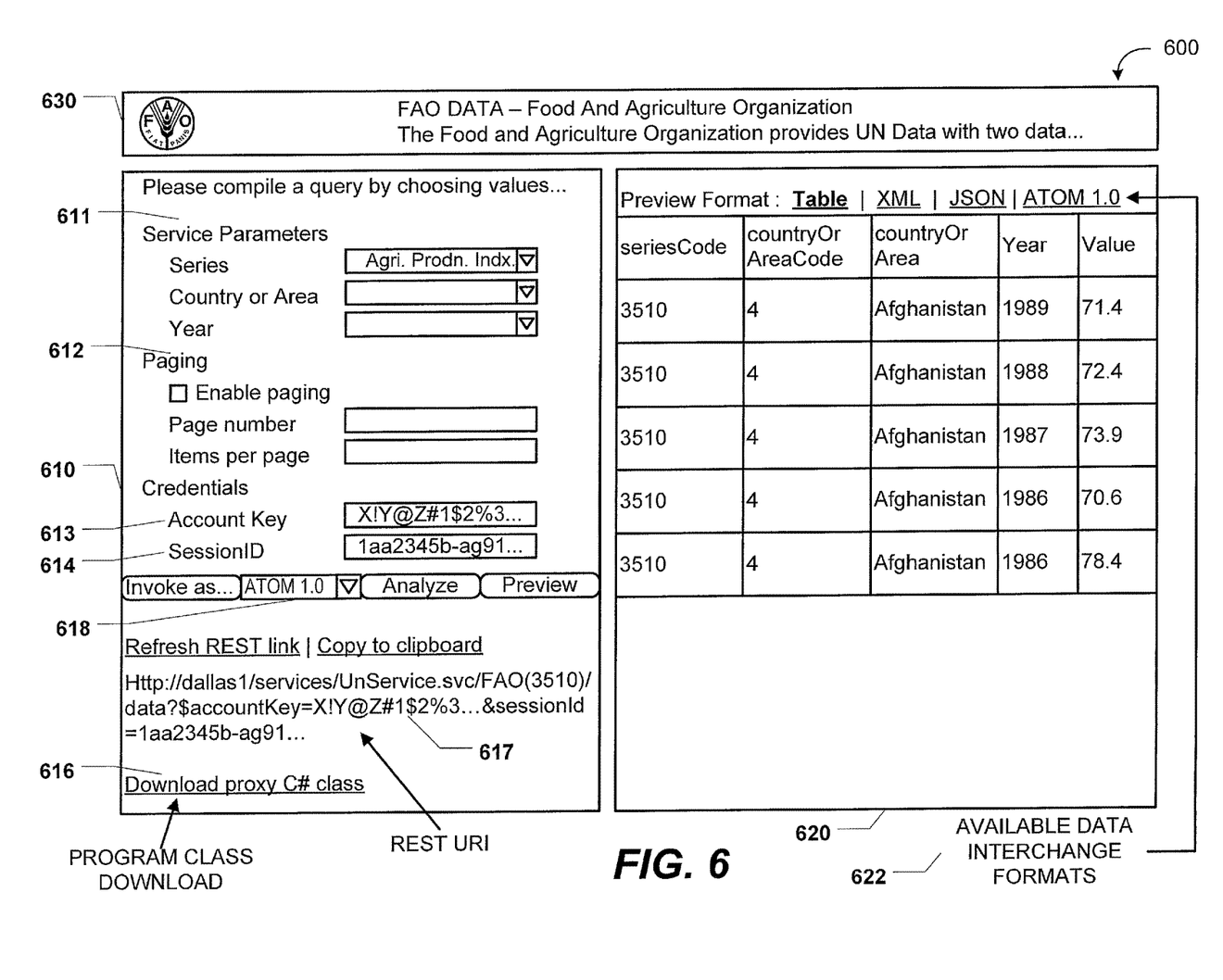
FIG. 6 is a diagram to illustrate a particular embodiment of an interface for a web service including previewing results of a query of the web service.

FIG. 6 is a diagram to illustrate a particular embodiment of an interface 600 for a web service, where the interface may preview results of a query of the web service. The interface 600 includes a query generation area 610, a results preview area 620, and a web service information area 630. In the particular embodiment illustrated in FIG. 6, the interface 600 is an interface to data provided by the Food and Agricultural Organization (FAO) of the United Nations (UN).

The web service information area 630 may include a title, description, and logo of the web service. In a particular embodiment, the title, description and logo are retrieved from a service specification for the web service as described with respect to the XML, service specification 300 of FIG. 3.

The query generation area 610 may also include various input parameter options and query generation options in accordance with service and series specifications. For example, the query generation area 610 may include a display of service parameters 611. For example, the service parameters 611 include "Series," "Country or Area," and "Year." The particular embodiment illustrated in FIG. 6 indicates a user selection of the Agricultural Production Index ("Agri. Prodn. Indx.) series. The query generation area 610 may also include a display of paging information (e.g., whether the web service supports paging). The query generation area 610 may further include a display of an Account Key 613, a SessionID 614 (e.g., a GUID), a REST URI 617, and a program class (e.g., a proxy C # class) download hyperlink 616. The query generation area 610 may also include an option to invoke a query in multiple available data interchange formats 622. For example, in the particular embodiment illustrated in FIG. 6, the query of the web service is invoked as an ATOM 1.0 feed. The query of the web service may alternately be invoked in any other data interchange format, such as RAW XML, or JSON.

The results preview area 620 may include a display of the results generated by invoking a query of the web service. For example, in the particular embodiment illustrated in FIG. 6, the results preview area 620 displays data from the Agricultural Production Index. The results preview area 620 may display the results in multiple available data interchange formats 622. For example, although the particular embodiment illustrated in FIG. 6 depicts the results displayed in a tabular format, the results may alternately be displayed at the results preview area 620 in a RAW XML format, a JSON format, or an ATOM 1.0 format. When user input changes the value of the service parameters 611, the results preview area 620 may be updated to display a preview of new results that are based on the changed service parameters 611.

Figure 7:
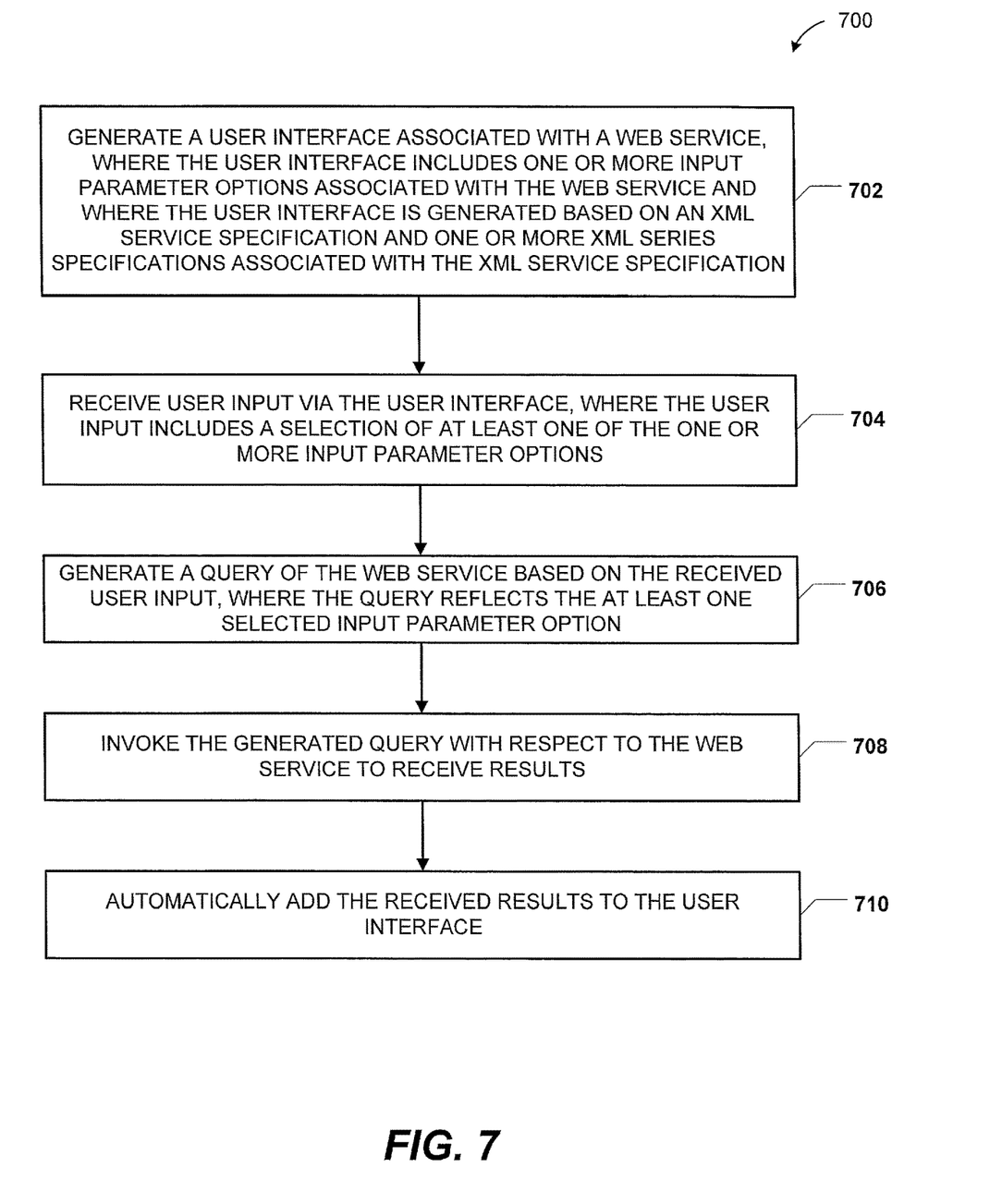
FIG. 7 is a flow diagram to illustrate a particular embodiment of a method to generate an interface for a web service and to query the web service.

FIG. 7 is a flow diagram to illustrate a particular embodiment of a method 700 to generate an interface for a web service and to query the web service. In an illustrative embodiment, the method 700 may be performed by the system 100 of FIG. 1.

The method 700 includes generating a user interface associated with a web service, at 702. The user interface includes one or more input parameter options associated with the web service and is generated based on an XML service specification and one or more XML series specifications associated with the XML service specification. For example, in FIG. 1, the interface module 110 may generate the user interface 114 based on the service and series specifications 112 associated with the web service 140, where the user interface 114 includes the input parameter options 116. As another example, as illustrated in FIG. 6, the interface 600 may be generated, where the interface 600 includes the service parameters 611.

The method 700 also includes receiving user input via the user interface, where the user input includes a selection of at least one of the one or more input parameter options, at 704. For example, in FIG. 1, the user input 104 may be received via the user interface 114, where the user input 104 includes a selection of the input parameter options 116. As another example, as illustrated in FIG. 6, the Agricultural Production Index may be selected.

The method 700 further includes generating a query of the web service based on the received user input, where the query reflects the at least one selected input parameter option, at 706. For example, in FIG. 1, the query module 120 may generate the query 122. As another example, as illustrated in FIG. 6, a query of the Agricultural Production Index data series (e.g., a structured query language (SQL) query "select*from AgriProdnIndx") may be generated.

The method 700 includes invoking the generated query with respect to the web service to receive results, at 708. For example, in FIG. 1, the query module 120 may invoke the query 122 and the results module 130 may receive the results 132. As another example, as illustrated in FIG. 6, the query of the Agricultural Production Index may be invoked and the results displayed in the results preview area 620 may be received.

The method 700 also includes automatically adding the received results to the user interface, at 710. For example, in FIG. 1, the results module 130 may automatically add the results 132 to the user interface 114. As another example, as illustrated in FIG. 6, the results may be displayed in the results preview area 620 of the interface 600.

Figure 8:
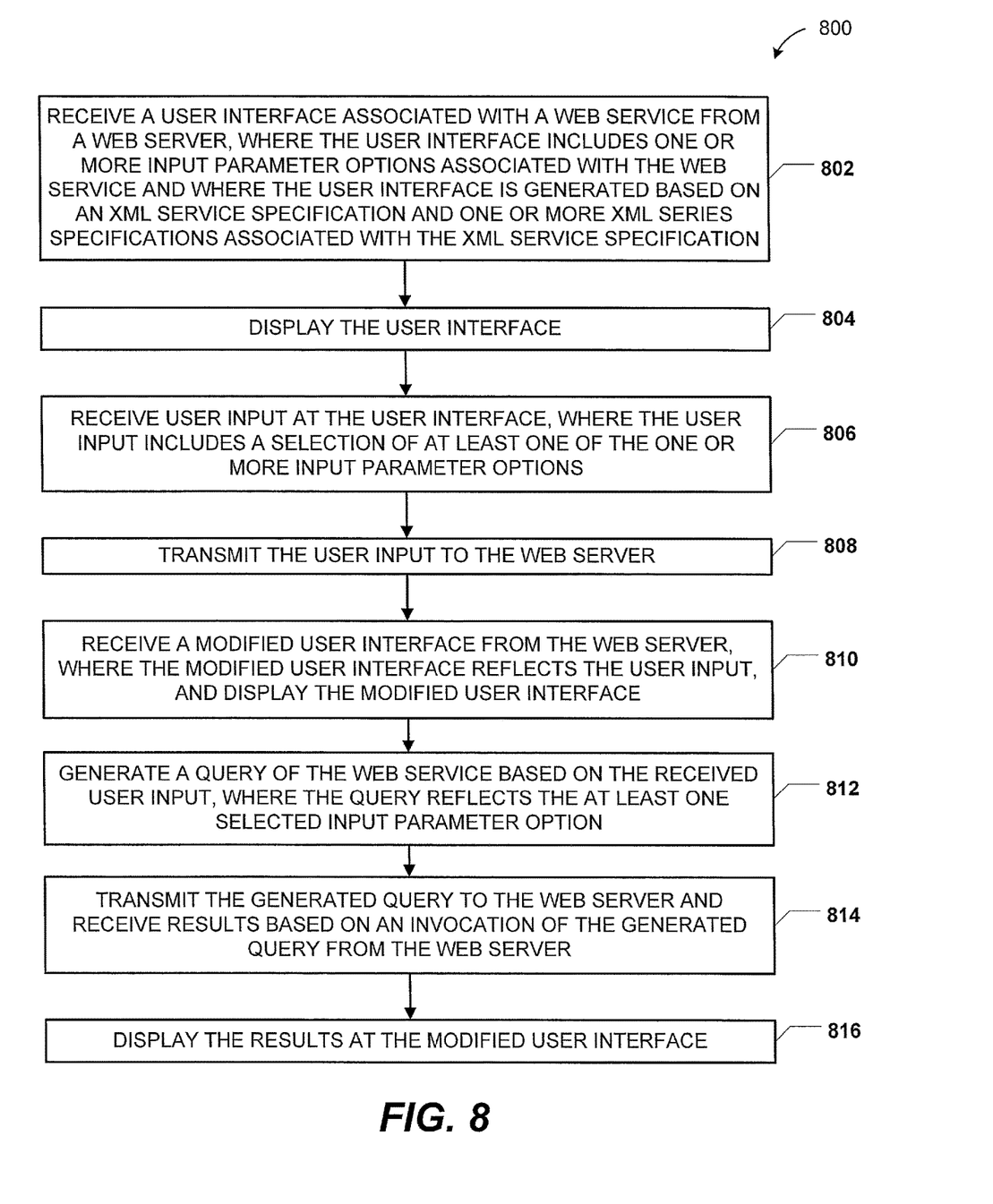
FIG. 8 is a flow diagram to illustrate a particular embodiment of a method of receiving an interface for a web service and generating a query of the web service.

FIG. 8 is a flow diagram to illustrate a particular embodiment of a method 800 of receiving an interface for a web service and generating a query of the web service. In an illustrative embodiment, the method 800 may be performed at the system 200 of FIG. 2.

The method 800 includes receiving a user interface associated with a web service from a web server, at 802, and displaying the user interface, at 804. The user interface includes one or more input parameter options associated with the web service and is generated based on an XML, service specification and one or more XML, series specifications associated with the XML service specification. For example, in FIG. 2, the user interface 214 associated with the web service 240 may be received from the server 260 and displayed at the display device 206, where the user interface 214 is generated based on the series and service specifications 212. As another example, as illustrated in FIG. 6, the interface 600 may be displayed, where the interface 600 is generated based on XML service and series specifications.

The method 800 also includes receiving user input at the user interface, at 806, and transmitting the user input to the web server, at 808. The user input includes a selection of at least one of the one or more input parameter options. For example, in FIG. 2, the user input 204 may be received and transmitted to the web server 260. As another example, as illustrated in FIG. 6, the Agricultural Production Index may be selected.

The method 800 further includes receiving a modified user interface from the web server and displaying the modified user interface, at 810. The modified user interface reflects the user input. For example, in FIG. 2, the modified user interface 215 may be received from the web server 260 and displayed at the display device 206. As another example, as illustrated in FIG. 6, the selection of the Agricultural Production Index may be indicated by the "Series" drop down menu at the interface 600.

The method 800 includes generating a query of the web service based on the received user input, where the query reflects the at least one selected input parameter option, at 812. For example, in FIG. 2, the query 222 may be generated. As another example, as illustrated in FIG. 6, a query of the Agricultural Production Index data series may be generated.

The method 800 also includes transmitting the generated query to the web server and receiving results based on an invocation of the generated query from the web server, at 814. For example, in FIG. 2, the query 222 may be transmitted to the web server 260 and the results 232 based on an invocation of the query 222 may be transmitted from the web server 260. As another example, as illustrated in FIG. 6, the query of the Agricultural Production Index may be invoked and the results displayed in the results preview area 620 may be received.

The method further includes displaying the results at the modified user interface, at 816. For example, in FIG. 2, the results 232 may be displayed at the modified user interface 215 at the display device 206. As another example, as illustrated in FIG. 6, the results may be displayed in the results preview area 620 of the interface 600.

Figure 9:
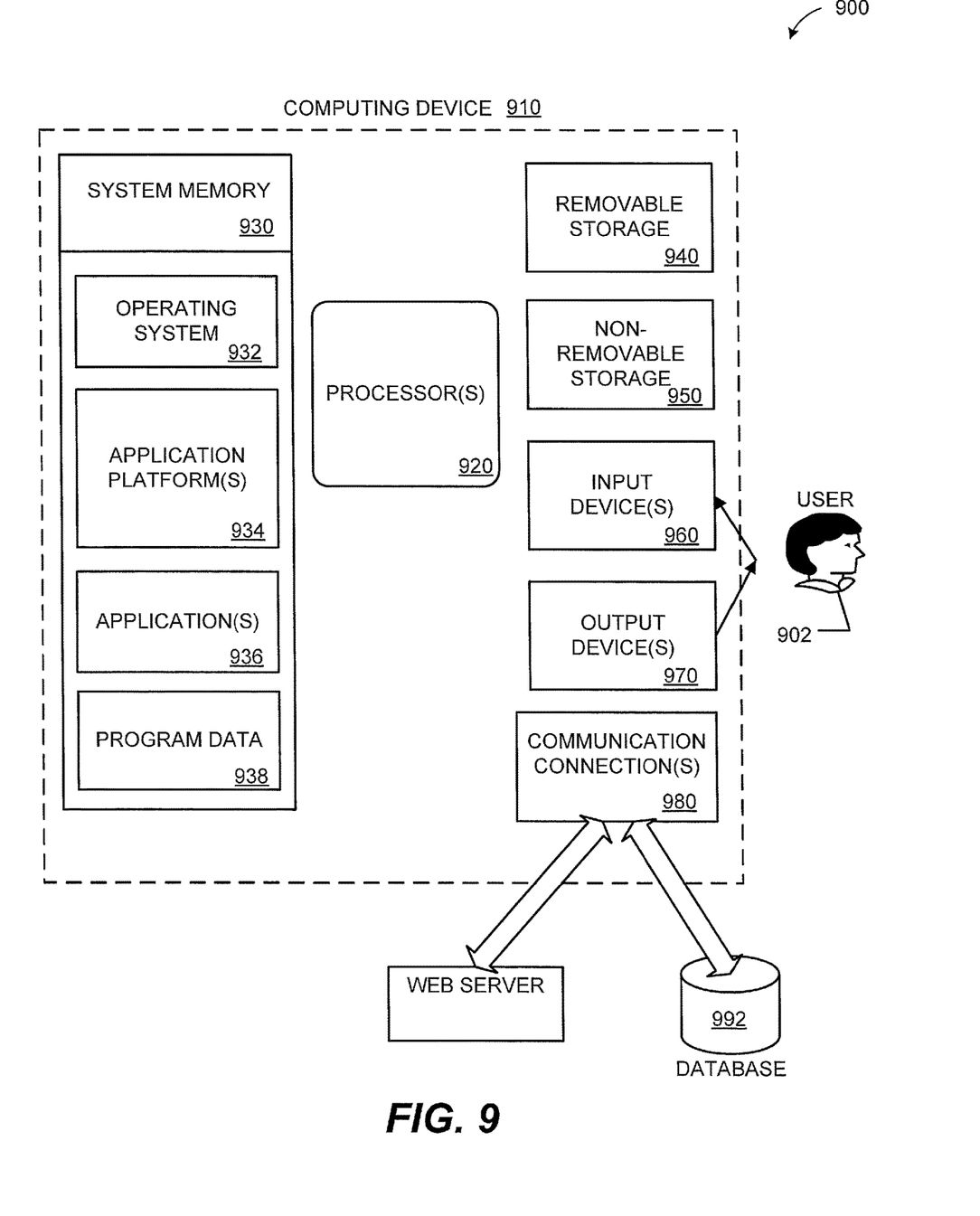
FIG. 9 is a block diagram of a computing environment including a computing device operable to support embodiments of computer-implemented methods, computer program products, and system components as illustrated in FIGS. 1-8.

FIG. 9 depicts a block diagram of a computing environment 900 including a computing device 910 operable to support embodiments of computer-implemented methods, computer program products, and system components according to the present disclosure. In an illustrative embodiment, the computing device 910 may include one or more of the modules 110, 120, 130 of FIG. 1, the web service 140 of FIG. 1, and the display device 206 of FIG. 2. Each of the modules 110, 120, 130 of FIG. 1, the web service 140 of FIG. 1, and the display device 206 of FIG. 2 may include or be implemented using the computing device 910 or a portion thereof.

The computing device 910 includes at least one processor 920 and a system memory 930. Depending on the configuration and type of computing device, the system memory 930 may be volatile (such as random access memory or "RAM"), non-volatile (such as read-only memory or "ROM," flash memory, and similar memory devices that maintain stored data even when power is not provided), or some combination of the two. The system memory 930 typically includes an operating system 932, one or more application platforms 934, one or more applications 936, and may include program data 938 associated with the one or more applications.

The computing device 910 may also have additional features or functionality. For example, the computing device 910 may also include removable and/or non-removable additional data storage devices such as magnetic disks, optical disks, tape, and standard-sized or miniature flash memory cards. Such additional storage is illustrated in FIG. 9 by removable storage 940 and non-removable storage 950. Computer storage media may include volatile and/or non-volatile storage and removable and/or non-removable media implemented in any technology for storage of information such as computer-readable instructions, data structures, program components or other data. The system memory 930, the removable storage 940 and the non-removable storage 950 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 910. Any such computer storage media may be part of the computing device 910. The computing device 910 may also have input device(s) 960, such as a keyboard, mouse, pen, voice input device, touch input device, etc. Output device(s) 970, such as a display, speakers, printer, etc. may also be included. A user 902 may be able to interact with the computing device 910 via the input device(s) 960 and the output device(s) 970.

The computing device 910 also contains one or more communication connections 980 that allow the computing device 910 to communicate with other computing devices (e.g., a web server 990 and a database 992) over a wired or a wireless network. In an illustrative embodiment, the web server 990 is the web server 260 of FIG. 1 and the database 992 is the database 150 of FIG. 1 or the database 250 of FIG. 2.

It will be appreciated that not all of the components or devices illustrated in FIG. 9 or otherwise described in the previous paragraphs are necessary to support embodiments as herein described. For example, the removable storage 940 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system comprising:
one or more processor(s); and
one or more hardware storage device having stored thereon executable instructions that are executable by the one or more processor(s) to cause the system to at least:
  display a user interface that is associated with a web service of a web server and that is configured to display one or more input parameter option(s) associated with the web service, wherein the user interface is initially based on a plurality of different series specifications;
  receive user input via the user interface, the user input selecting a particular input parameter option from among the one or more input parameter option(s) and being used to generate a query with respect to the web service;
  transmit the user input and the query to the web server;
  receive results of the query; and
  based on the results of the query, limit a bounds of a particular user interface element, which is displayed in the user interface, to reflect only a bounded series specification selected from the plurality of different series specifications such that the user interface is now based on the bounded series specification as opposed to the entire plurality of different series specifications.

2. The system of claim 1, wherein the plurality of different series specifications is represented in extensible markup language (XML) and is associated with a single service specification, and wherein the single service specification is retrieved by appending a service identifier string to an end of a uniform resource locator (URL) of the web service.

3. The system of claim 1, wherein the query is generated by use of a representational state transfer (REST) uniform resource identifier (URI).

4. The system of claim 3, wherein the user interface includes a display of at least one of an account key, a session identifier, a program class download hyperlink, and the representational state transfer (REST) uniform resource identifier (URI).

5. The system of claim 1, wherein execution of the executable instructions further causes the system to update a hyperlink for a program class generated as part of the query.

6. The system of claim 1, wherein the plurality of different series specifications define interface specifications associated with the user interface, and wherein the interface specifications reference actions based on the user input.

7. The system of claim 1, wherein the plurality of different series specifications define interface specifications associated with the user interface, and wherein the interface specifications reference a parameter listing representing possible values displayable in a drop down menu.

8. A method comprising:
displaying a user interface that is associated with a web service of a web server and that is configured to display one or more input parameter option(s) associated with the web service, wherein the user interface is initially based on a plurality of different series specifications;
receiving user input via the user interface, the user input selecting a particular input parameter option from among the one or more input parameter option(s) and being used to generate a query with respect to the web service;
transmitting the query to the web server;
receiving results of the query; and
based on the results of the query, limiting a bounds of a particular user interface element, which is displayed in the user interface, to reflect only a bounded series specification selected from the plurality of different series specifications such that the user interface is now based on the bounded series specification as opposed to the entire plurality of different series specifications.

9. The method of claim 8, wherein the plurality of different series specifications is represented in extensible markup language (XML) and is associated with a single service specification, and wherein the single service specification is retrieved by appending a service identifier string to an end of a uniform resource locator (URL) of the web service.

10. The method of claim 8, wherein the query is generated by use of a representational state transfer (REST) uniform resource identifier (URI).

11. The method of claim 10, wherein the user interface includes a display of at least one of an account key, a session identifier, a program class download hyperlink, and the representational state transfer (REST) uniform resource identifier (URI).

12. The method of claim 8, wherein the method further includes updating a hyperlink for a program class generated as part of the query.

13. The method of claim 8, wherein the plurality of different series specifications define interface specifications associated with the user interface, and wherein the interface specifications reference actions based on the user input.

14. The method of claim 8, wherein the plurality of different series specifications define interface specifications associated with the user interface, and wherein the interface specifications reference a parameter listing representing possible values displayable in a drop down menu.

15. One or more hardware storage device(s) having stored thereon computer-executable instructions that are executable by one or more processor(s) of a computing system to cause the computing system to at least:
   display a user interface that is associated with a web service of a web server and that is configured to display one or more input parameter option(s) associated with the web service, wherein the user interface is initially based on a plurality of different series specifications;
   receive user input via the user interface, the user input selecting a particular input parameter option from among the one or more input parameter option(s) and being used to generate a query with respect to the web service;
   transmit the query to the web server;
   receive results of the query; and
   based on the results of the query, limit a bounds of a particular user interface element, which is displayed in the user interface, to reflect only a bounded series specification selected from the plurality of different series specifications such that the user interface is now based on the bounded series specification as opposed to the entire plurality of different series specifications.

16. The one or more hardware storage device(s) of claim 15, wherein the plurality of different series specifications is represented in extensible markup language (XML) and is associated with a single service specification, and wherein the single service specification is retrieved by appending a service identifier string to an end of a uniform resource locator (URL) of the web service.

17. The one or more hardware storage device(s) of claim 15, wherein the query is generated by use of a representational state transfer (REST) uniform resource identifier (URI).

18. The one or more hardware storage device(s) of claim 17, wherein the user interface includes a display of at least one of an account key, a session identifier, a program class download hyperlink, and the representational state transfer (REST) uniform resource identifier (URI).

19. The one or more hardware storage device(s) of claim 15, wherein execution of the computer-executable instructions further causes the computing system to update a hyperlink for a program class generated as part of the query.

20. The one or more hardware storage device(s) of claim 15, wherein the plurality of different series specifications define interface specifications associated with the user interface, and wherein the interface specifications reference actions based on the user input.

* * * * *